Aug. 12, 1941.  C. H. SCHLESMAN  2,252,667
CATALYTIC APPARATUS
Filed Jan. 4, 1941   3 Sheets-Sheet 1

INVENTOR
CARLETON H. SCHLESMAN
BY
ATTORNEY

Aug. 12, 1941.       C. H. SCHLESMAN       2,252,667
CATALYTIC APPARATUS
Filed Jan. 4, 1941       3 Sheets-Sheet 2

INVENTOR
CARLETON H. SCHLESMAN
BY
[signature]
ATTORNEY

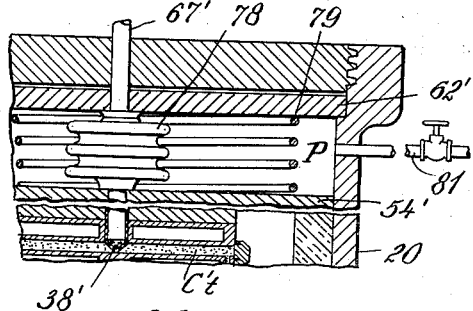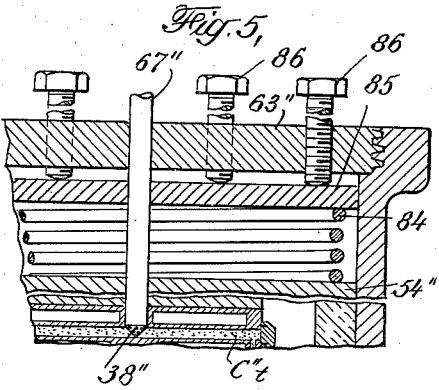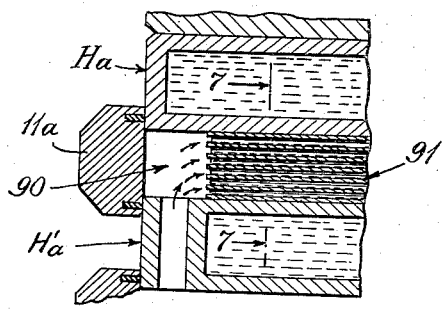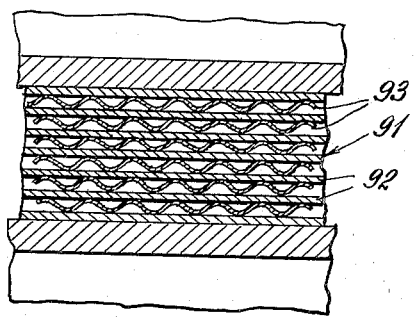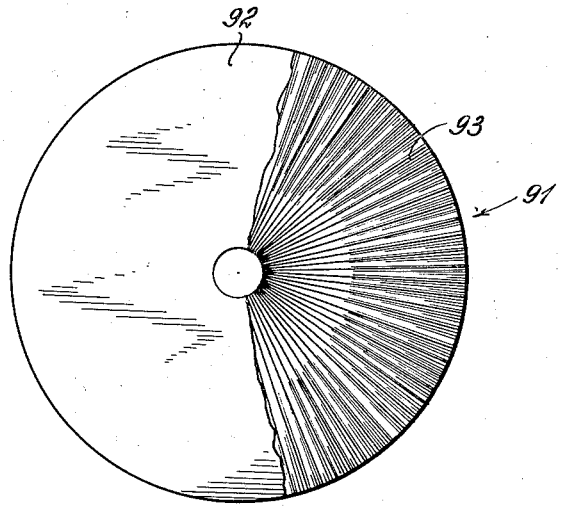

Patented Aug. 12, 1941

2,252,667

UNITED STATES PATENT OFFICE 2,252,667

CATALYTIC APPARATUS

Carleton H. Schlesman, Camden, N. J., assignor to Socony-Vacuum Oil Company, Incorporated, New York, N. Y., a corporation of New York Application January 4, 1941, Serial No. 373,073

10 Claims. (Cl. 23—288)

This invention has to do with apparatus for carrying out catalytic reactions and is more particularly concerned with apparatus wherein a reactant or reaction mixture in the vapor or gaseous phase is passed through a catalyst mass associated with means for effecting heat exchange between the catalyst and a circulating heat-exchange medium.

It is the primary object of this invention to provide an apparatus of the class described, wherein highly efficient heat-transfer relationship is established and maintained between all portions of the catalyst mass and the heat-transfer medium. Thus, the apparatus contemplated by this invention is particularly adapted for use in those catalytic reactions, such as the catalytic oxidation of aromatic hydrocarbons, wherein close temperature control is highly important to the production of a preponderance of the desired oxidation product.

The apparatus contemplated herein is adapted to use catalysts of the so-called "solid type" or of the so-called "surface type." The former type of catalyst is comprised of minute particles of catalytic material, or inert material treated to provide a catalytic surface, and in the usual use of catalysts of this so-called solid type difficulty is ordinarily experienced because of the tendency to channel during passage of the gases or vapors therethrough, thus short-circuiting the reaction medium. It is a further object of the present invention to provide an apparatus wherein channeling through the catalyst mass is prevented.

The foregoing objects are accomplished by employing a relatively thin catalyzer unit, or a plurality of such units, arranged in juxtaposed relation with one another, the catalyzer units being interposed between hollow heat-exchange units or platens, the heat-exchange surfaces of which may be spirally or annularly grooved or channelled and are maintained in high pressure-contact with the catalyzer unit or units. Heat-exchange medium is circulated through the heat-exchange units, and a reaction fluid is circulated through the catalyzer units.

It is a still further object of this invention to provide an apparatus of the class described which is capable of operation at high pressures where such pressures are desirable, such object being accomplished by enclosing the assembly of catalyzer units and heat-exchange units in a pressure-resistant shell and filling the shell with an inert gas, or with the products of the catalytic reaction, under pressure substantially the same as the pressure of the reactant fluid passing through the interior of the catalyzer unit assembly.

As aforesaid, the apparatus may be used with various types of catalytic material in the catalyzer units; and the arrangement is such that the catalyst may, if desired, be reactivated in place from time to time, or it may be readily changed as the operation requires. As will more fully appear from the description which follows, the apparatus may be used with various types of heat-exchange medium, depending upon the temperature conditions which it is desired to maintain in the reaction, and it will also be apparent that the apparatus may be employed in connection with reactions of either the exothermic or the endothermic type.

Further details in the catalytic apparatus contemplated by this invention may be obtained from the following description of the accompanying drawings which are chosen for illustrative purposes only and in which:

Fig. 4 is a fragmentary sectional elevation showing a modified form of pressure-applying means in an apparatus otherwise similar to that shown in Fig. 1;

Fig. 5 is a fragmentary sectional elevation similar to Fig. 4 but showing a modified form of pressure-applying means;

Fig. 6 is an enlarged fragmentary section illustrating the details in the construction of a catalyzer unit and heat-exchange unit assembly with a modified form of catalyst mass;

Fig. 7 is an enlarged section on the line 7—7 of Fig. 6; and

Fig. 8 is a plan view, partly broken away, illustrating further details in this modified form of catalyzer unit assembly.

Figure 1:
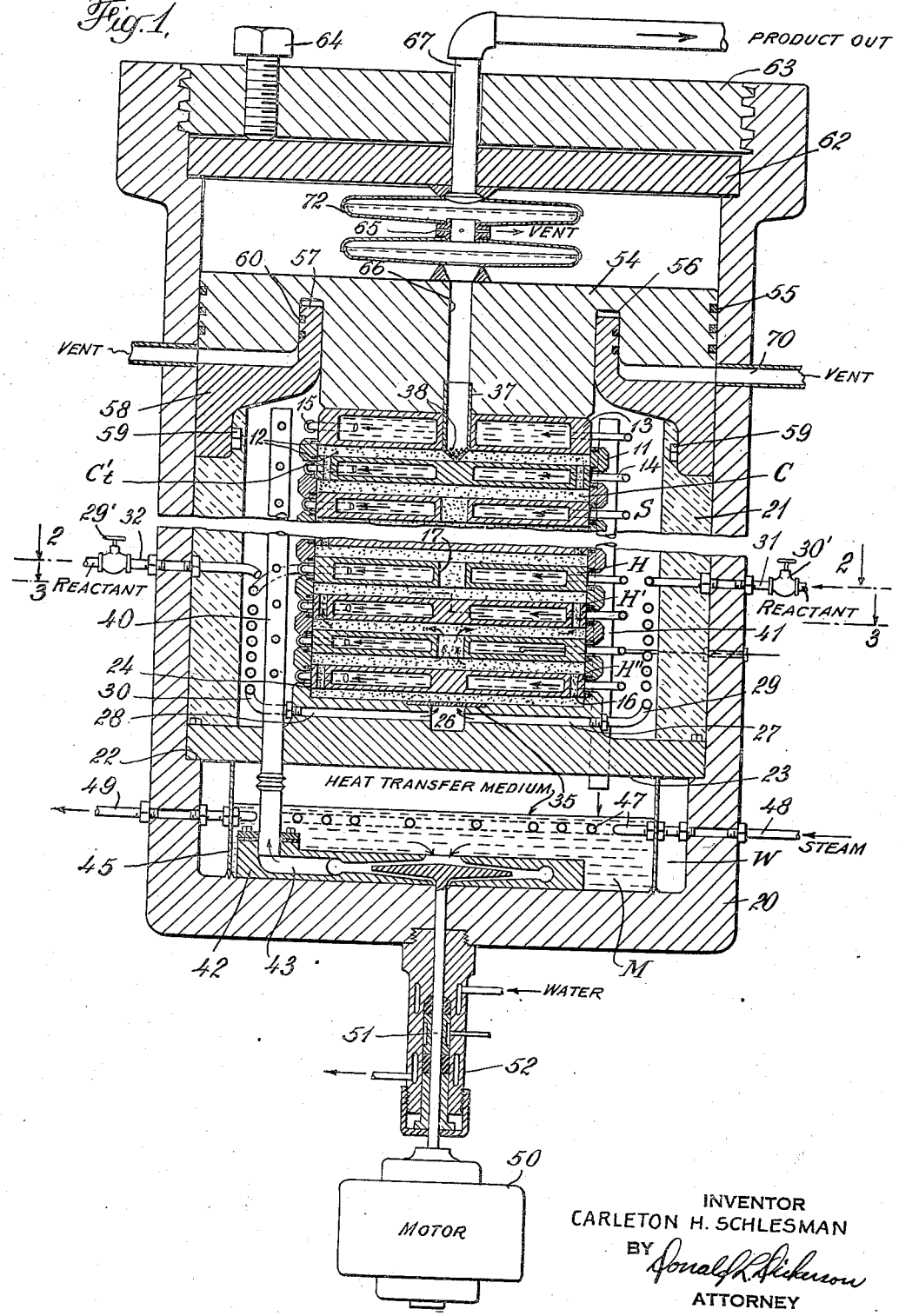
Fig. 1 is a sectional elevation taken along the line 1—1 of Fig. 2.

Referring now to Fig. 1, the catalyzer units, which in this form of my invention are illustrated as being of the so-called "solid type," are indicated generally by the reference letter C, and the heat-exchange units are generally indicated by the reference letters H and H'. The catalyzer units C may be considered as thin wafers of catalytic material interposed between the heat-exchange units H and H' which are hollow metal platens, such platens being in sliding engagement at their peripheries with suitable enclosing means, which in the present embodiment are shown as comprising closure rings 11 provided at their inner surfaces with sealing rings 12. With this arrangement it will be seen that the application of pressure upon the uppermost platen or heat-exchange member 13 will carry the applied pressure through the entire unit and force the heat-exchange surfaces of the platens or heat-exchange members H and H' into pressure-engagement with the successive catalyzer units.

Each of the hollow platens is provided with an inlet connection 14 and an outlet connection 15 through which the heat-exchange medium may be circulated. The alternate platens in the assembly (those indicated by reference character H') are provided with a plurality of peripheral apertures 16, each intermediate platen H being provided with a central aperture 17, so that the flow of the reaction fluid through the successive catalyzer units will be successively from center toward the periphery, and vice versa.

It will be understood that the assembly of catalyzer units and heat-exchange units described above may be embodied in, or associated with, various types of containers and means for circulating and controlling the temperature of the heat-exchange medium as well as various types of well-known means for preheating and delivering the reactant fluid into the first catalyzer unit.

It will also be understood that the arrangement of the platens and the connections for the reactant fluid may be such that the reactant is circulated through the catalyzer units in parallel instead of in series, as shown by the arrangement of the alternate peripheral and central apertures. It will also be understood that various means may be employed for applying pressure to the catalyzer unit assembly.

In the present embodiment of my invention, however, I have shown a compact arrangement in which the catalyzer unit assembly, the storage for heat-exchange medium, its circulating means and heat-control means are all contained in a single case. This case or shell is indicated by reference numeral 20, and it will be observed that the case is made of somewhat greater diameter than the catalyzer unit assembly so as to provide a space S between the exterior of the catalyzer unit assembly and the interior of the case, which in the form shown is provided with a wall of insulating material indicated by numeral 21. The case or shell is preferably constructed so as to resist extremely high pressures and, as will hereinafter appear, is provided with means whereby the catalyzer unit-heat-exchange unit assembly is sealed within a pressure chamber and is at the same time susceptible of expansion and contraction.

The bottom portion of the case is provided with a shoulder 22 which carries a plate 23, the upper surface of which is recessed as indicated at 24 to provide a support for the bottom heat-exchange unit or platen H''.

Figure 2:
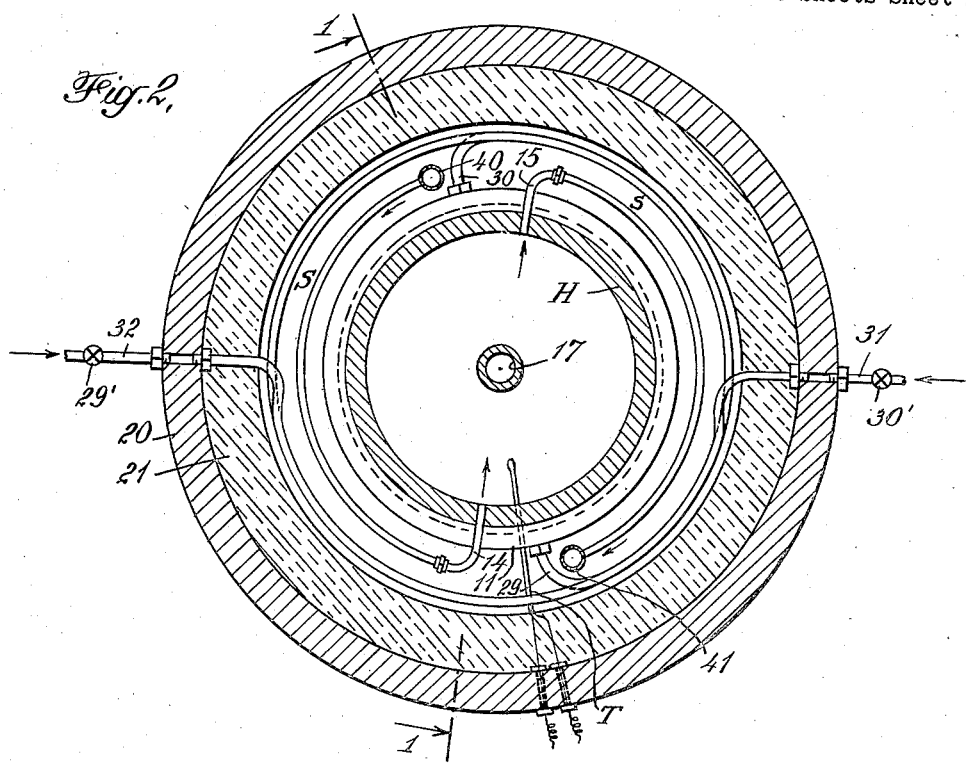
Fig. 2 is a plan section along the line 2—2 of Fig. 1.
Figure 3:
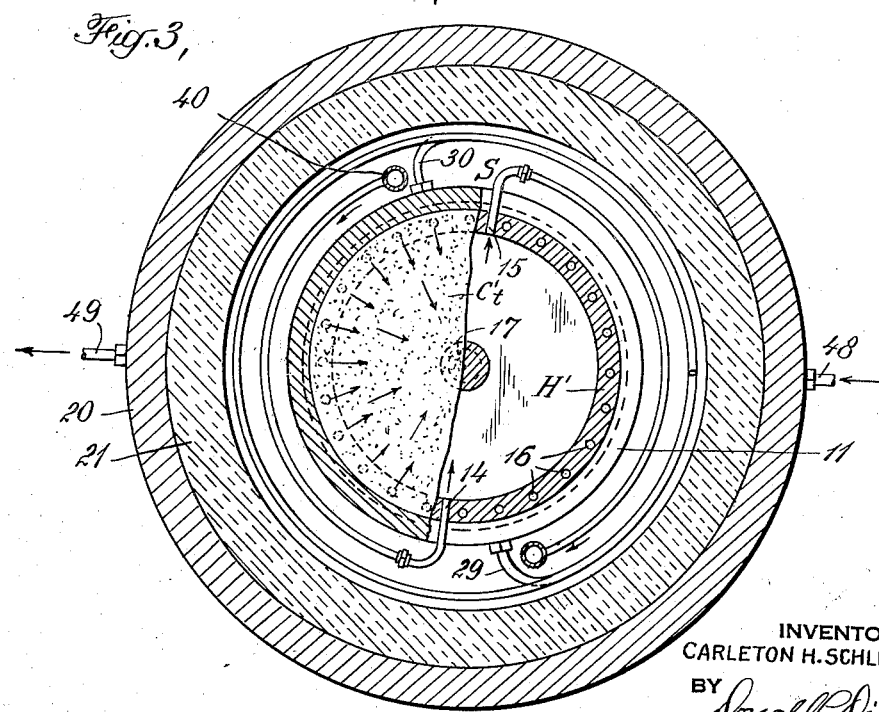
Fig. 3 is an offset plan section along the offset line 3—3 of Fig. 1.

The central portion of the plate 22 is provided with a well 26 communicating with passages 27 and 28, which in turn are threaded to receive spiral conduits 29 and 30, such conduits connecting through the wall of the shell or container with inlet connections 31 and 32, as shown in Fig. 1 and Fig. 2. In this manner the reactant fluids are preheated in the space between the catalyzer assembly and the insulating wall prior to their admission to the first catalyzer unit.

The reactant fluids entering the well 26 pass up through the perforations in a catalyst-supporting plate 35 and flow outwardly through the catalyst mass to the periphery, where they pass up through the peripheral apertures 16, and then in the next catalyst mass they flow inwardly from the periphery to the next-succeeding central aperture and so on throughout the assembly, finally passing from the assembly through a suitable exit connection which in the form shown comprises a hollow thimble member 37 having a perforated lower end 38 extending down into the uppermost catalyzer unit or catalyst mass C't.

In this form of my invention the inlet and outlet connections 14 and 15 to the interiors of the heat-exchange units are connected to manifold pipes 40 and 41. These pipes extend down through the supporting plate 23 into a well provided in the bottom of the case for the heat-exchange medium. This well, in the present form of my invention, is provided with a pump 42, the discharge connection 43 of which communicates with the lower end of the manifold pipe 40.

A skirt 45 is provided in the well W to confine the heat-exchange medium which is indicated by the letter M. Means for controlling the temperature of the heat-exchange medium are also provided in the well, and in this embodiment of my invention such means are shown as comprising a steam coil 47 having inlet and outlet connections 48 and 49. Suitable means for operating the pump, such as the motor 50, the shaft 51 of which extends through a water-cooled packing gland 52, are also provided. The temperature of the heat-exchange medium is controlled so as to maintain predetermined temperature conditions in the catalyzer units, such control being effected through the use of a thermocouple T connected with a suitable thermostatic control, not shown.

Pressure is applied to the top of the catalyzer unit-heat-exchange unit assembly by means of a pressure plate or follower plate 54 which slidably engages the interior of the enclosing shell 20, and in the form shown is provided with sealing rings 55 to form a pressure-tight chamber above the plate 54. The bottom of the plate is undercut as indicated at 56 to provide an annular groove adapted to receive a sealing collar or flange 57 formed on the top portion of a ring 58 which is secured to the inner surface of the enclosing shell or case in a suitable manner as by means of screws 59. A pressure seal is provided between the plate 54 and the ring 57 by means of sealing rings 60. The top of the enclosing shell is sealed by a suitable closure plate 62 and a cover plate 63 provided with pressure screws 64.

In this embodiment of my invention the pressure applied to the plate 54 is obtained from the reactant gases which fill the chamber between the pressure plate 54 and the sealing plate 62 from vents 65 in the connection between the outlet passage 66 in the pressure plate and a discharge connection 67. The interior of the shell beneath the pressure plate 54 is vented as indicated at 70 so that a substantial pressure-differential is maintained between the two surfaces of the pressure plate to provide the application of high pressure to the catalyzer unit assembly.

It is desirable, in order to prevent excessive channeling of the catalyst mass, which might result from its expansion or contraction during changes in temperature, to employ a pressure-applying medium which is yieldable. Such yieldable application of pressure is naturally obtained when the pressure is applied by a hydraulic principle as in the embodiment shown in Fig. 1.

Yieldable means, such as the Belleville springs 72, are provided to hold the unit in assembled relation in case of a pressure failure in the top pressure chamber during operation.

In the operation of the apparatus described above, the selection of a catalyst will depend upon the reaction or conversion which is to be carried out. In this embodiment, as aforesaid, the catalyst shown is of the so-called "solid type:" that is, a granular catalyst the mass of which may, if desired, be laminated by interposing corrugated wire mesh between the layers of the catalyst granules. The catalytic material may, for example, be comprised of a weak catalyst or carrier such as alumina, silica, porous porcelain, or the like, impregnated with materials which impart catalytic and promoting action to the mass such as copper oxide containing a trace of vanadium pentoxide or the like. Also, solid catalysts wherein the material itself has catalytic properties may be used, an example of such a material being carefully purified and promoted iron oxide. Catalyzer units of the "surface type" may take various forms, an example of which will be hereinafter described. The selection of a heat-exchange medium M will also depend upon the conversion or reaction which is to be carried out, but for the purposes of the present apparatus a fused salt bath such as an alkali nitrite or nitrate or mixture thereof is preferred. Other heat-exchange media which may be used are mercury, sulfur and the like.

As aforesaid, the apparatus may be used in carrying out a reaction or conversion which is either exothermic or endothermic, and the thin catalyzer units and their extreme pressure-contact with the surfaces of the heat-exchange units make for a highly efficient transfer of heat either to or from the heat-exchange medium so that the temperature of the catalyst mass can be closely controlled to maintain conditions conducive to the production of the particular product desired.

In a typical operation, the heat-exchange medium M is first brought up to the desired temperature by a suitable heater, such as the steam coil 47, and is circulated through the heat-exchange units H, H', H'', etc., to bring the catalyzer units up to temperature. In this way the space S, which may be filled with an inert gas or gaseous reaction product under the pressure of operation, is heated. A reactant, mixture of reactants, or two separate reactants are then admitted to the preheating coils 29 and 30 through valves 29' and 30', and after passing through such coils, the gaseous or vapor reactant or reactants in a preheated condition are admitted to the first catalyzer unit through the well 26. The products of the reaction leaving the apparatus through the outlet pipe 67 may be conducted to suitable apparatus for isolating and purifying the various components.

For example, liquid toluene may be supplied to the converter under pressure. It enters the vaporizing and preheating coil 29 through valve 29' and is flashed into a gas. In the well or chamber 26 the preheated toluene vapor mixes with preheated air from the coil 30 under a pressure of from 1000 to 2000 pounds per square inch, and the mixture immediately passes through the successive catalyzer units C. The temperature is controlled by the facilities heretofore described. Having passed through the catalyst mass, the reaction products and unconverted charge and other gases pass through pipe 67 to a cooler and from there into a condenser and purification equipment, not shown.

During reaction the steam coil 49 may act as a cooler. Wet steam enters the coil and is superheated, thus removing heat, so that the oxidation takes place as a true catalytic reaction, the preponderant product being controlled by the temperature in the catalyst mass, the pressure on the reaction mixture, the rate of flow through the apparatus, etc.

In the modification shown in Fig. 4, the application of hydraulic or pneumatic pressure to the pressure plate 54' is effected through hydraulic fluid from a source external of the unit. In this embodiment of my invention the discharge connection 67' is a sealed conduit extending into the topmost catalyst cell C't, as indicated at 38', such conduit connection being provided with a bellows connection 78 to permit the necessary expansion and contraction. A coil spring 79 is interposed between the sealing plate 62' and the pressure plate 54' to hold the unit in assembly in case of failure in the hydraulic pressure. A pressure fluid is delivered to the chamber P from any suitable source through the valved connection 81.

In Fig. 5, I have shown a modification wherein pressure is mechanically applied to the catalyzer unit-heat-exchange unit assembly. In this embodiment the outlet conduit 67'' is sealed in the uppermost heat-exchange platen with its perforated outlet extending into the top catalyzer unit C't, as indicated at 38''. Resting on top of the pressure plate 54'' is a heavy coil spring 84 capable of yieldably applying the desired pressure to the catalyzer unit assembly. Mechanical pressure is applied to the upper end of the spring 84 in any suitable manner as by means of the follower plate 85 and screws 86 threaded into the cover plate 63.

In Figs. 6–8 inclusive, I have shown a modified form of catalyzer unit employing a "catalyst mass" of the "surface type." Here it will be observed that the heat-exchange platens Ha and Ha' cooperate with the sealing ring 11a to form a reaction cell 90 containing a stack of metal washers indicated generally by numeral 91. These washers are alternately flat, as indicated at 92, and radially grooved or corrugated, as indicated at 93, (see Figs. 7 and 8) so as to leave ample space for passage of, and an extensive surface for contact with, the reactant gas or vapors. It is desirable to make the washers thin, perhaps 0.01 inch thick, and their surfaces are chemically treated to produce the desired catalytic activity. Such activation may be obtained, for example, by boiling aluminum washers in potassium dichromate solutions. It will be understood, of course, that the surface activation may be obtained in various ways, and by a proper selection of metal and surface activation the most effective catalyst for a particular type of reaction may be obtained. It will also be understood that various modifications may be made for spacing the washers and that in case a highly porous catalyst surface is provided, other spacing means may be eliminated and, as was the case with the solid type of catalyst, the application of extreme pressure between the stack of washers and their adjacent heat-exchange members greatly enhances the heat-transfer relationship between the catalyst mass and the heat-exchange medium, thereby making possible more accurate heat-control and greatly increased efficiency in the conversion or reaction.

It is to be understood that while I have herein described and illustrated one preferred embodiment of my invention with certain modifications therein, that the invention is not limited to the specific embodiments and details described, but includes within its scope whatever changes and modifications fairly come within the spirit of the appended claims.

I claim:

1. In a catalytic apparatus, the combination of two relatively movable hollow platens formed of heat-conducting material and spaced apart to provide a catalyst space between their opposed surfaces; means engaging the peripheries of said platens to substantially seal said catalyst space; a catalyst mass in said catalyst space; means operable upon said platens for applying pressure to said catalyst mass; means for circulating a heat transfer medium through said platens and means for circulating a reactant fluid through said catalyst mass.

2. In a catalytic apparatus, the combination of two relatively movable hollow platens formed of heat-conducting material and spaced apart to provide a catalyst space between their opposed surfaces; means engaging the peripheries of said platens to substantially seal said catalyst space; a catalyst mass in said catalyst space; means operable upon said platens for applying pressure to said catalyst mass, and means for circulating a heat transfer medium through said hollow platens, one of said platens having a central aperture and the other platen having peripheral apertures whereby reactant fluid may be circulated through the catalyst mass.

3. In a catalytic apparatus, the combination of a plurality of intercommunicating catalyzer units; hollow platens of heat-conducting material interposed between the successive catalyzer units; means for circulating a heat-exchange medium through said hollow platens; and means for forcing the successive platens into pressure-contact with their corresponding catalyzer units.

4. In a catalytic apparatus, the combination of a plurality of relatively thin intercommunicating catalyzer units; hollow platens of heat-conducting material interposed between the successive catalyzer units; means for circulating a heat-exchange medium through said hollow platens; and means for forcing the successive platens into pressure-contact with their corresponding catalyzer units.

5. In a catalytic apparatus, the combination of a plurality of relatively thin intercommunicating catalyzer units; hollow platens of heat-conducting material interposed between the successive catalyzer units; means for circulating a heat exchange medium through said hollow platens; and yieldable means for forcing the successive platens into pressure-contact with their corresponding catalyzer units.

6. In a catalytic apparatus, the combination of a plurality of juxtaposed catalyzer units; hollow platens of heat-conducting material interposed between the successive catalyzer units; means for circulating a heat-transfer medium through said platens; means for forcing the successive platens into pressure engagement with their corresponding catalyzer units; and means for circulating a reactant fluid through said catalyzer units.

7. In a catalytic apparatus, the combination of a plurality of juxtaposed relatively thin catalyzer units; hollow platens of heat-conducting material interposed between the successive catalyzer units; peripheral enclosing means surrounding said catalyzer units and slidably engaging the peripheries of said platens; means for forcing the successive platens into pressure engagement with their corresponding catalyzer units; means for circulating a heat-transfer medium through said platens; and means for circulating a reactant fluid through said catalyzer units.

8. In a catalytic apparatus, the combination of a plurality of juxtaposed relatively thin catalyzer units; hollow platens of heat-conducting material interposed between the successive catalyzer units; peripheral enclosing means for said catalyzer units comprising a ring surrounding each catalyzer unit and slidably engaging the peripheries of the adjacent platens; means for forcing the successive platens into pressure contact with their corresponding catalyzer units; means for circulating a heat-transfer medium through said platens; and means for circulating a reactant fluid through said catalyzer units.

9. In a catalytic apparatus, the combination of a plurality of juxtaposed relatively thin catalyzer units; hollow platens of heat-conducting material interposed between the successive catalyzer units; peripheral enclosing means surrounding said catalyzer units and slidably engaging the peripheries of said platens; means for circulating a heat-transfer medium through said platens; and means for forcing the successive platens into pressure engagement with their corresponding catalyzer units, said platens being alternately provided with a central aperture and peripheral apertures for the passage of a reactant fluid through said catalyzer units.

10. In a catalytic apparatus, the combination of a relatively thin catalyzer unit; a hollow heat-transfer unit engaging said catalyzer unit; means for circulating a heat-transfer medium through said heat-transfer unit; pressure-actuated means for maintaining continuous pressure-engagement between the two units; and means for circulating reactant fluid through said catalyzer unit.

CARLETON H. SCHLESMAN.